Dec. 19, 1922. 1,439,463.
E. ZAPARKA.
STEERING ARRANGEMENT FOR MOTOR VEHICLES.
FILED MAY 6, 1922.

Inventor
E. Zaparka,
By Marks&Clerk
Attys.

Patented Dec. 19, 1922.

1,439,463

UNITED STATES PATENT OFFICE.

EDUARD ZAPARKA, OF VIENNA, AUSTRIA.

STEERING ARRANGEMENT FOR MOTOR VEHICLES.

Application filed May 6, 1922. Serial No. 558,984.

*To all whom it may concern:*

Be it known that I, EDUARD ZAPARKA, a citizen of the Austrian Republic, residing at Vienna (X), Austria, have invented certain new and useful Improvements in and Relating to Steering Arrangements for Motor Vehicles (for which I have filed applications in Austria, March 29, 1921; Germany, March 27, 1922; Czecho-Slovakia, March 24, 1922), of which the following is a specification.

This invention relates to a steering arrangement for motor-vehicles, in which the movement of the steering pillar is transformed into swinging motion on a lever, this being effected by a spiral guide-way or groove provided in a disc mounted at the lower end of the steering pillar.

The provision of spiral for attaining a self-impeding steering-movement is already known, but heretofore the lever to which the movement is imparted is arranged in such a manner, that its swinging movement takes place in a plane which passes through the steering pillar.

According to the present invention the lever is arranged in such a manner, that it will move or swing in a vertical plane with respect to the steering pillar, this resulting in a very simple construction. A further advantage of the arrangement according to the present invention consists in that the adjustment of the interengaging parts (necessary owing to wear) is greatly simplified, as only the shaft round which the lever is turning will require a small longitudinal adjustment and thus render it possible, that a conical projection of the lever which works in the spiral groove is continuously forced towards the bottom face of the said groove. This conical projection is fixed to the lever, e. g., it is not movably secured to the latter.

A steering arrangement according to the present invention is shown, by way of example, on the accompanying drawing, in which—

Figure 1:
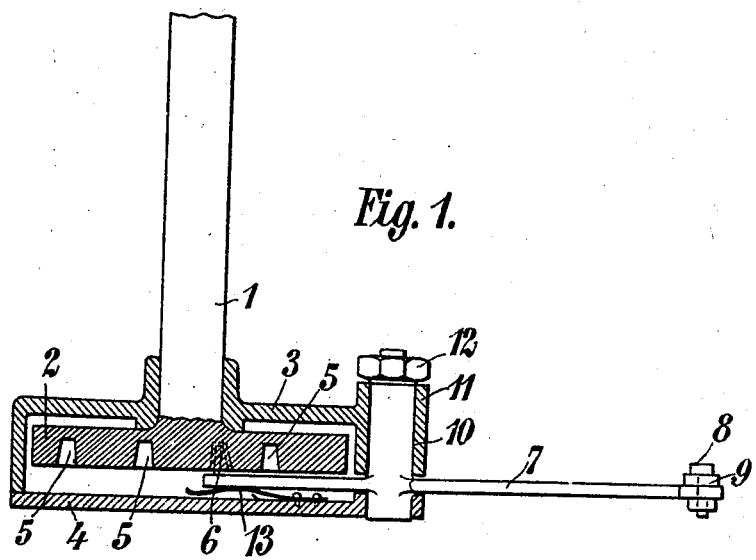

Fig. 1 is a vertical section through the steering arrangement, and

Figure 2:
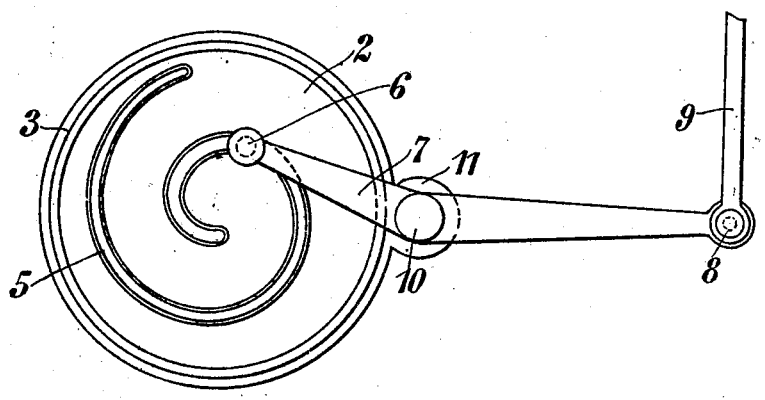

Fig. 2 an inverted plan view thereof, but with the cover of the casing removed.

The steering pillar 1 and a disc 2 are made in one piece. The disc and its co-acting parts are completely enclosed in a casing formed by a cup-shaped part 3 and a lid or covering 4. The disc is provided with a slightly tapered groove or guide-way 5 of the shape of an Archimedean spiral. A conical pin or projection 6, secured to one arm of double-armed lever 7, engages the groove of the disc, the other arm of the said lever being attached to the steering lever 9 by means of a screw-bolt 8 or the like.

The shaft 10 of the lever 7 is pivotally located in a boss 11 of the casing 3 and is reduced at its upper end for the reception of a nut 12.

A spring 13 secured to the covering 4 forces the projection 6 so far into the groove 5 until its sides will rest against the side walls of the groove. This takes place even if the projection is already somewhat worn, as the same will not rest against or contact with the bottom of the groove. If the projection 6 is somewhat worn, the same may be moved deeper into the groove by a corresponding longitudinal adjustment of the shaft 10.

It will be obvious that the arrangement according to the present invention is self-impeding and even if worn does not permit play between the co-acting parts.

I claim—

1. A steering arrangement for motor vehicles comprising in combination a steering post, a disc carried centrally of the post and in a plane at right angles to the axis thereof and provided on one face with a vertically arranged spiral groove the sides of which are inclined, a longitudinally adjustable shaft arranged parallel to the steering post, a double-armed lever secured to and movable with the shaft and a conical projection on one end of the lever of a depth shorter than the groove for cooperative engagement with the groove, and resilient means for continuously maintaining the projection in engagement with the sides of the groove.

2. A steering arrangement for motor vehicles comprising in combination a steering post, a casing in which the lower end of the post is journalled, a disc carried centrally of the lower end of the post and in a plane at right angles to the axis thereof and arranged within the casing, the outer face of the disc being provided with a vertically disposed spiral groove the sides of which are inclined, a bearing carried with the wall of the casing and vertically thereof, a shaft journalled in the casing, means for adjusting the shaft longitudinally, a double-armed lever carried by the shaft, one arm of the lever being arranged within the casing, a conical projection on the arm in the casing and of a length shorter than the depth of the groove for cooperative engagement therewith and a spring arranged in the casing and acting on the lever to continuously maintain the projection in contact with the sides of the groove, substantially as and for the purposes set forth.

In testimony whereof I affix my signature in presence of two witnesses.

EDUARD ZAPARKA.

Witnesses:
 CARL COUDENHAY,
 HY. KARLELLAGE.